US011966823B2

(12) United States Patent
Doran et al.

(10) Patent No.: US 11,966,823 B2
(45) Date of Patent: Apr. 23, 2024

(54) SYSTEMS AND METHODS FOR INTELLIGENT CONTRACT ANALYSIS AND DATA ORGANIZATION

(71) Applicant: Argenti Health Inc., Seattle, WA (US)

(72) Inventors: Bethany Doran, Lake Stevens, WA (US); Robert Bender, Lake Stevens, WA (US)

(73) Assignee: Argenti Health Inc., Seattle, WA (US)

( * ) Notice: Subject to any disclaimer, the term of this patent is extended or adjusted under 35 U.S.C. 154(b) by 729 days.

(21) Appl. No.: 17/078,010

(22) Filed: Oct. 22, 2020

(65) Prior Publication Data

US 2021/0125297 A1   Apr. 29, 2021

Related U.S. Application Data

(60) Provisional application No. 62/925,102, filed on Oct. 23, 2019.

(51) Int. Cl.
*G06N 20/00* (2019.01)
*G06F 21/62* (2013.01)
*G06F 40/289* (2020.01)
*G06F 40/30* (2020.01)
*G06F 40/56* (2020.01)
*G06Q 50/18* (2012.01)
*G06F 40/211* (2020.01)
*G06F 40/284* (2020.01)

(52) U.S. Cl.
CPC ......... *G06N 20/00* (2019.01); *G06F 21/6245* (2013.01); *G06F 40/289* (2020.01); *G06F 40/30* (2020.01); *G06F 40/56* (2020.01); *G06Q 50/18* (2013.01); *G06Q 50/188* (2013.01); *G06F 40/211* (2020.01); *G06F 40/284* (2020.01)

(58) Field of Classification Search
CPC ... G06N 20/00; G06F 21/6245; G06F 40/289; G06F 40/30; G06F 40/56; G06F 40/211; G06F 40/284; G06Q 50/18; G06Q 50/188
USPC ............................................................. 704/9
See application file for complete search history.

(56) References Cited

U.S. PATENT DOCUMENTS 6,606,744 B1 * 8/2003 Mikurak .................. H04L 9/40
717/174
6,671,818 B1 * 12/2003 Mikurak ................ H04L 63/08
714/48

(Continued)

*Primary Examiner* — Edwin S Leland, III
(74) *Attorney, Agent, or Firm* — Perkins Coie LLP

(57) ABSTRACT

Examples of the present disclosure describe systems and methods for intelligent contract analysis and data organization. In example aspects, input data may be received into the system in the form of a legal document, such as a contract. The contract may be processed by a natural-language processor, and a summarized version of the contract and/or particular contract provisions may be provided. In other aspects, a machine-learning engine may process the input data in combination with a user's decisions to accept or reject particular contract provisions. The ML engine may provide an intelligent recommendation to a user regarding whether the user should consent or not consent to a particular contract provision. In other example aspects, a data dashboard displaying how a user's personally identifiable information (PII) is shared with third parties may be displayed. Aggregated PII may further be displayed in a dashboard.

20 Claims, 9 Drawing Sheets

(56) References Cited

U.S. PATENT DOCUMENTS

| | | | |
|---|---|---|---|
| 7,124,101 B1* | 10/2006 | Mikurak | G06Q 10/0631 705/7.12 |
| 7,130,807 B1* | 10/2006 | Mikurak | G06Q 30/0202 705/7.31 |
| 7,716,077 B1* | 5/2010 | Mikurak | G06Q 10/0631 705/7.12 |
| 7,957,991 B2* | 6/2011 | Mikurak | G06Q 10/063 705/7.11 |
| 8,032,409 B1* | 10/2011 | Mikurak | G06Q 30/00 705/14.39 |
| 8,271,336 B2* | 9/2012 | Mikurak | G06Q 50/12 705/7.29 |
| 8,560,366 B2* | 10/2013 | Mikurak | G06Q 10/06 705/7.12 |
| 8,732,023 B2* | 5/2014 | Mikurak | G06Q 30/0269 705/22 |
| 9,922,345 B2* | 3/2018 | Mikurak | G06Q 30/0261 |
| 10,013,705 B2* | 7/2018 | Mikurak | G06Q 50/12 |
| 10,231,077 B2* | 3/2019 | Raduchel | G16H 10/60 |
| 10,892,057 B2* | 1/2021 | Kochura | G16H 10/60 |
| 10,949,228 B1* | 3/2021 | Graham | H04M 1/72403 |
| 10,998,103 B2* | 5/2021 | Kochura | G16H 50/70 |
| 11,048,874 B2* | 6/2021 | Allen | G16H 50/20 |
| 11,145,289 B1* | 10/2021 | Graham | G10L 13/08 |
| 11,200,967 B1* | 12/2021 | Jain | G16H 50/70 |
| 11,297,459 B2* | 4/2022 | Raduchel | H04W 4/02 |
| 11,341,514 B2* | 5/2022 | Thakkar | G06F 18/24155 |
| 11,481,906 B1* | 10/2022 | Narayanan | G06V 10/7753 |
| 2004/0064351 A1* | 4/2004 | Mikurak | G06Q 30/0269 705/22 |
| 2006/0178918 A1* | 8/2006 | Mikurak | G06Q 10/06315 705/7.31 |
| 2011/0251868 A1* | 10/2011 | Mikurak | G06Q 10/06315 705/7.25 |
| 2012/0089410 A1* | 4/2012 | Mikurak | G06Q 10/00 705/1.1 |
| 2012/0259722 A1* | 10/2012 | Mikurak | G06Q 30/0261 705/26.1 |
| 2014/0222610 A1* | 8/2014 | Mikurak | G06Q 30/0269 705/26.5 |
| 2015/0269617 A1* | 9/2015 | Mikurak | G06Q 30/0633 705/14.54 |
| 2017/0161439 A1* | 6/2017 | Raduchel | G16H 10/60 |
| 2017/0193174 A1* | 7/2017 | Allen | G06F 40/279 |
| 2018/0101652 A1* | 4/2018 | Kochura | G16H 50/30 |
| 2018/0101657 A1* | 4/2018 | Kochura | G16H 50/30 |
| 2018/0315141 A1* | 11/2018 | Hunn | G06F 9/547 |
| 2019/0208354 A1* | 7/2019 | Raduchel | G06F 21/6245 |
| 2019/0303623 A1* | 10/2019 | Reddy | G06F 8/71 |
| 2021/0027316 A1* | 1/2021 | Thakkar | G06F 18/24155 |
| 2021/0119785 A1* | 4/2021 | Ben-Reuven | H04L 63/126 |
| 2021/0125297 A1* | 4/2021 | Doran | G06N 20/00 |

* cited by examiner

SYSTEMS AND METHODS FOR INTELLIGENT CONTRACT ANALYSIS AND DATA ORGANIZATION

CROSS-REFERENCE TO RELATED APPLICATIONS

This application claims priority to U.S. Patent Application No. 62/925,102 filed Oct. 23, 2019, the content of which are herein incorporated in its entirety.

BACKGROUND

Many people do not understand how their personal data is used. With the proliferation of data breaches and incomprehensible online agreements, consumers lack confidence in being able to control how their personal data is used, shared, and in some cases, monetized by third parties. For example, users often fall prey to click-to-agree contracts by hurriedly "accepting" terms without fully reading the contract and understanding exactly what the user is consenting to with regard to the user's data. Specifically in the healthcare industry, many healthcare businesses ask for patients to "consent" to giving the healthcare business their personally identifiable information ("PII") for "research purposes." However, often times, a patient is not compensated for providing his or her PII to the healthcare entity, even if the "research" that was later conducted using the patient's PII is used to develop a groundbreaking new drug that generates significant revenues for the healthcare entity but not the patient. This issue can be diminished if patients, and consumers in general, had more control and transparency of their personal data and could better understand the provisions to which they are considering agreeing.

Several governments around the world have taken notice of this problem and attempted to legislate a solution. For example, the EU recently implemented the General Data Protection Regulation ("GDPR") that mandates a baseline set of standards for companies that handle EU citizens' data to better safeguard the processing and movement of citizens' personal data. In California, a privacy bill was recently signed into law known as the California Consumer Privacy Act ("CCPA"), which is intended to give Californians more information on how businesses handle consumers' personal information. Despite these government efforts, however, consumers are still lacking the tools to actually control their data, understand clearly and quickly exactly what a third party is asking them to consent to, and understand how their data is being used by third parties.

Another common issue among businesses is the organization and sharing of customer data. Currently, the process is cumbersome for a business to share data with another third-party. Typically, the business must first request from the customer directly that the business may share customer PII with a third-party. As this process exponentiates, continually requesting consent from customers for each individual request to share with a third-party becomes nearly impossible. There is currently no efficient way to aggregate company requests for sharing PII. Moreover, there is currently no efficient way to aggregate the company requests for sharing PII, present them coherently to a user, and clearly request the user to consent to sharing data with certain third parties.

It is with respect to these and other general considerations that example aspects, systems, and methods have been described. In addition, although relatively specific problems have been discussed, it should be understood that the examples should not be limited to solving specific problems identified in the Background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Examples of the present disclosure describe systems and methods for intelligent contract analysis and organization. In aspects, certain legal contracts and/or documents may be provided to a system. The contracts may be analyzed by at least one natural-language processing ("NLP") algorithm that is configured to distill the contract into more understandable and readable form (e.g., a summary and/or a visual indicator/symbol). The contract language and the NLP-generated summaries may be presented to a user who is deciding whether to agree to certain terms and conditions of the contract. The user may then input a selection of accepting or rejecting the contract and/or a provision or provisions of the contract. Over time, a user's selections of acceptance and rejection may be stored in a database. At least one machine-learning model may be trained on this database to determine at least one pattern regarding which types of contracts and provisions a user is more likely to accept and more likely to reject. The trained machine learning model may be applied to a user's future decision of whether to accept or reject a contract or provision, where the system may recommend to the user whether the user should accept or reject the terms based on historical patterns of the user's decisions to accept or reject similar contracts and/or provisions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

DETAILED DESCRIPTION

Figure 1:
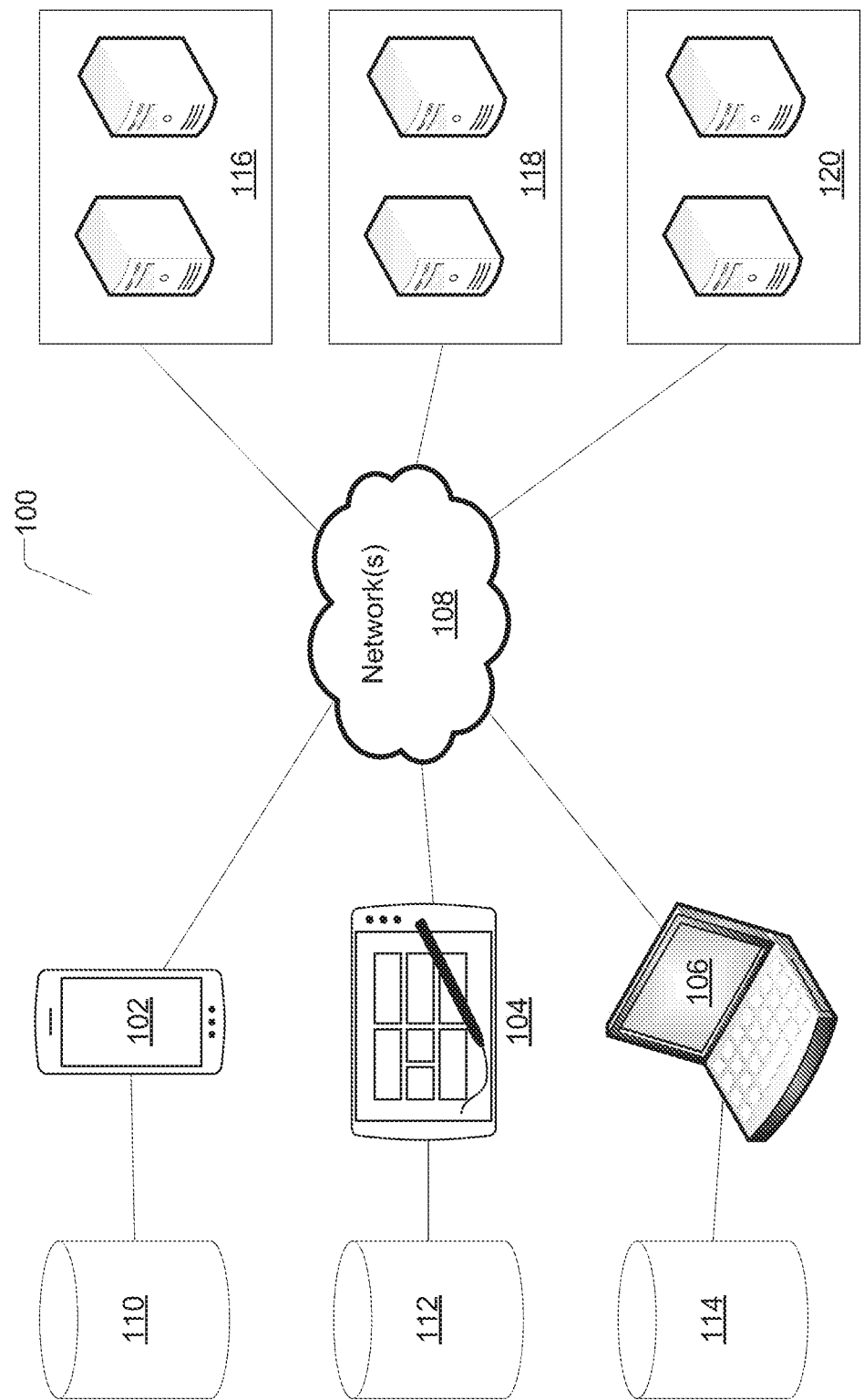
FIG. 1 illustrates an example of a distributed system for implementing the disclosed technology.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Providing users with a platform to understand, control, and organize their personal data in relation to the contracts and provisions to which they have agreed allows for users to gain more transparency over their personal identifiable information, as well as improve how data is transferred, stored, and retrieved from computer systems generally. The systems and methods disclosed herein not only provide businesses and other third parties tools to comply with certain privacy laws and collect personal data from users in a meaningful way, but also provide users with the ability to control and organize their data according to a user's privacy tolerance and preferences.

Systems and methods for intelligently analyzing contracts and subsequently organizing personally identifiable information (PII) is disclosed herein. The system may be accessed by both user-consumers and businesses (or third parties, generally). The consumer-facing side of the system may be configured to allow users to enter their PII and then subsequently decide where to share that PII. For instance, the system may allow the user to accept or reject a certain contract presented to the user from a business entity. From the business-facing side of the system, a business may be able to track which user(s) have accepted and rejected certain terms of their contracts, as well as safely and compliantly manage PII. For example, the system described herein may be equipped to allow a business to easily respond to a request to be forgotten or a request for erasure by quickly and efficiently identifying the requesting user, the PII stored on that user, and which PII needs to be deleted based on the request. In some examples, the system described herein may automate the process of deletion and/or erasure without human intervention. In other examples, a combination of automation and human oversight may be implemented for deletion and/or erasure (e.g., utilizing human intervention for final confirmation of deletion or erasure of PII). Throughout this application, PII may include but is not limited to full name, Social Security Number (SSN), driver's license number, passport number, bank account number, physical address, email address, biometric identification (e.g., unique electrical signature of a heartbeat, fingerprint, genetic information), and other identifying characteristics that may be combined to identify a particular person. In some example aspects, at least one machine learning algorithm may use a combination of PII to uniquely identify a person.

The systems and methods may be executed on a number of electronic devices, including but not limited to, a personal computer, a mobile phone, a tablet, etc. The systems and methods may also be configured with the ability to receive and process natural language from at least one database configured to store legal contracts and provisions. The systems and methods may also be configured to process that NLP input of the contract, summarize the contract by extracting the relevant ontologies and assets of the particular provision, and provide a distilled and easy-to-read summary of the contract and/or provision to the user.

In other aspects of the invention disclosed, the systems and methods may be configured to implement at least one machine learning algorithm that may be applied to at least one database to train at least one machine learning model. For instance, a database may store a user's historical decisions of accepting or rejecting certain terms and conditions. Based on the user's historical patterns of accepting or rejecting certain terms and conditions, a machine-learning model may be trained, which may be able to provide intelligent recommendations to the user as to whether or not the user should accept or reject a certain contract and/or provision. In some example aspects, the machine-learning algorithm may be user-specific, such that each user may be associated with at least one base algorithm. Continuous user input (e.g., acceptances and rejections of certain contracts and provisions) may cause the at least one base machine-learning algorithm to adapt specifically to that user.

In other example aspects, the systems and methods described herein may be configured to intelligently identify which laws and regulations may govern a certain contract. For instance, a business that uses the business-side of the system may upload a particular contract into the system. Applying at least one NLP algorithm to the contract, the algorithm may determine that the contract is governed by a particular state, federal, and/or international regulation. Such information can be presented to the business with an assessment of whether the contract is complying or not complying with the identified state, federal, and/or international regulation.

In yet further aspects, the systems and methods described herein may be configured to identify certain ontologies from contracts using at least one machine-learning algorithm. For instance, a certain contract may reference "blood pressure" data but another contract may reference "pressure level" data in relation to a sphygmomanometer. Both contracts may be referring to the same PII data asset but are described differently in two different contracts. At least one machine-learning algorithm may be trained to recognize the similarity between the two terms and tag the "blood pressure" term and "pressure level" term with the same meta-tag, which may indicate that each of these terms in a provision are referring to the same PII data asset. Similar ontologies may be identified for words such as "consent" and "authorization." A contract that asks a user for "consent" and a contract that asks a user for "authorization" may be requesting the same type of agreement from a user, so both clauses may be meta-tagged similarly. Throughout this application, a meta-tag may refer to a snippet of text that describes a broader concept that may be referenced differently across multiple contracts and provisions. A meta-tag may be implemented by the systems and methods described herein to bring a level of consistency to a user and/or a business when dealing with certain contracts and provisions that may be referring to the same thing but use different language to describe it.

In some aspects, the systems and methods disclosed herein may be integrated within an existing enterprise resource planning ("ERP") system. For instance, a custom page may be developed using an ERP extension that has custom backend logic that ties into the intelligent contract analysis and data organization system described herein. Data that may have been previously collected in the ERP system may be shared with the intelligent contract analysis and data organization system, and in some aspects, the data from the intelligent contract analysis and data organization system may be shared with the ERP system. Customizations may be implemented in an ERP system to allow for cross-sharing of PII between the ERP system and intelligent contract analysis and data organization system. Such cross-sharing may be implemented in accordance with particular privacy regulations that limit which types of PII may be cross-shared across country borders and between systems with higher and lower levels of security and encryption capabilities.

Accordingly, the present disclosure provides a plurality of technical benefits. For instance, providing and storing a summarized version of a particular legal provision based on the results of at least one NLP algorithm applied to the original language of the provision may reduce overall memory storage and stress. Further, by utilizing meta-tags that have pre-identified particular ontologies may allow the underlying NLP algorithm(s) to distill certain legal language with greater speed while using less processing power. Another example of a technical benefit is the organizational benefits of PII that are produced through using the systems and methods disclosed herein. The database storage architecture described herein provides for greater transparency of PII, which allows for quicker lookup times in a database, pinpoint identification of certain types and classes of PII, transfer of PII, and deletion of PII. Specifically, when a user requests that his or her PII be deleted from a third-party entity, the current processes are cumbersome and often convoluted due to a lack of transparency and poor data organization. However, the systems and methods disclosed herein provide for precise organization and understanding of PII types and organizations that can easily be stored, referenced, transferred, and deleted while using less memory storage and processing resources, among other examples.

FIG. 1 illustrates an example of a distributed system for intelligent contract analysis and data organization. Example system 100 presented is a combination of interdependent components that interact to form an integrated whole for intelligently analyzing a contract and organizing data associated with that contract (e.g., user data, PII, business data, etc.). Components of the system may be hardware components or software implemented on, and/or executed by, hardware components of the system. For example system 100 comprises client devices 102, 104, and 106, local databases 110, 112, and 114, network(s) 108, and server devices 116, 118, and/or 120.

Client devices 102, 104, and 106 may be configured to access a web portal that implements the systems and methods described herein. In other example aspects, the systems and methods described herein may be a standalone executable software that is downloaded to a client device. In aspects, a client device, such as client devices 102, 104, and 106, may receive input from a user, such as user information that is collected during a sign-up process or login. The user information may be encrypted upon input. The encryption may occur locally on the client device, or the encryption may occur remotely at servers 116, 118, and/or 120, where the user information may be transmitted over network 108.

In other aspects, input data from a business may be received at client device 102, 104, and/or 106, where the input data may comprise at least one contract or legal document. The input data may be stored in local databases 110, 112, and/or 114 for further processing. In other aspects, the input data may be transmitted across network(s) 108 to remote servers 116, 118, and/or 120 for further processing.

In some aspects, the client devices 102, 104, and/or 106 may be configured to run at least one NLP algorithm locally. For instance, input data from a business may be stored locally in database 110, 112, and/or 114. The input data (e.g., legal contract) may be analyzed using at least one NLP algorithm stored on the client device 102, 104, and/or 106. The NLP algorithm may produce a summarized version of the contract and/or particular provision of the contract. The summary result of the NLP algorithm may further be stored locally in database(s) 110, 112, and/or 114. In other aspects, the summary result of the NLP algorithm may be transmitted across network(s) 108 to remote server(s) 116, 118, and/or 120.

In other aspects, input data from a user may be provided to one or more machine-learning (ML) models. Input data may refer to a historical dataset of a user's decisions to accept or reject particular terms of a contract. Such input data may be stored locally at the client device (database(s) 110, 112, and/or 114), remotely at server(s) 116, 118, and/or 120, and/or stored at a combination of both local and remote storage locations. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, a server device, a network appliance (e.g., a firewall, a router, etc.), or some combination thereof. The machine-learning (ML) models may process the input data to determine whether a user should accept or reject a certain term and/or condition within a legal document.

In some aspects, a user profile may also be created that captures a user's preferences with regard to sharing PII. A user profile may be created at the outset of using the systems and methods described herein (e.g., a user may be prompted to create a profile upon signing up). The ML models described herein may use a user's profile in conjunction with a user's historical data of accepting and rejecting particular terms and conditions to then provide an intelligent recommendation as to whether a user should accept or reject a future term and/or condition.

The NLP algorithms, ML algorithms, and ML models described herein may be stored and implemented locally at client device(s) 102, 104, and/or 106. In other aspects, the algorithms and models described herein may be stored or implemented remotely at server(s) 116, 118, and/or 120. Client devices 102, 104, and 106 may be configured to access the algorithms and models described herein via network(s) 108 if the algorithms and models are stored remotely. The training of an ML model may include the use of one or more supervised or unsupervised learning techniques, including but not limited to pattern recognition techniques. The trained ML model may be deployed to one or more devices. As a specific example, an instance of a trained ML model may be deployed to a server device and to a client device. The ML model deployed to sever device may be configured to be used by the client device when, for example, the client device is connected to the internet. Conversely, the ML model deployed to client device may be configured to be used by the client device when, for example, the client device is not connected to the internet. In such an example, the ML model may be locally cached by the client device.

Figure 2:
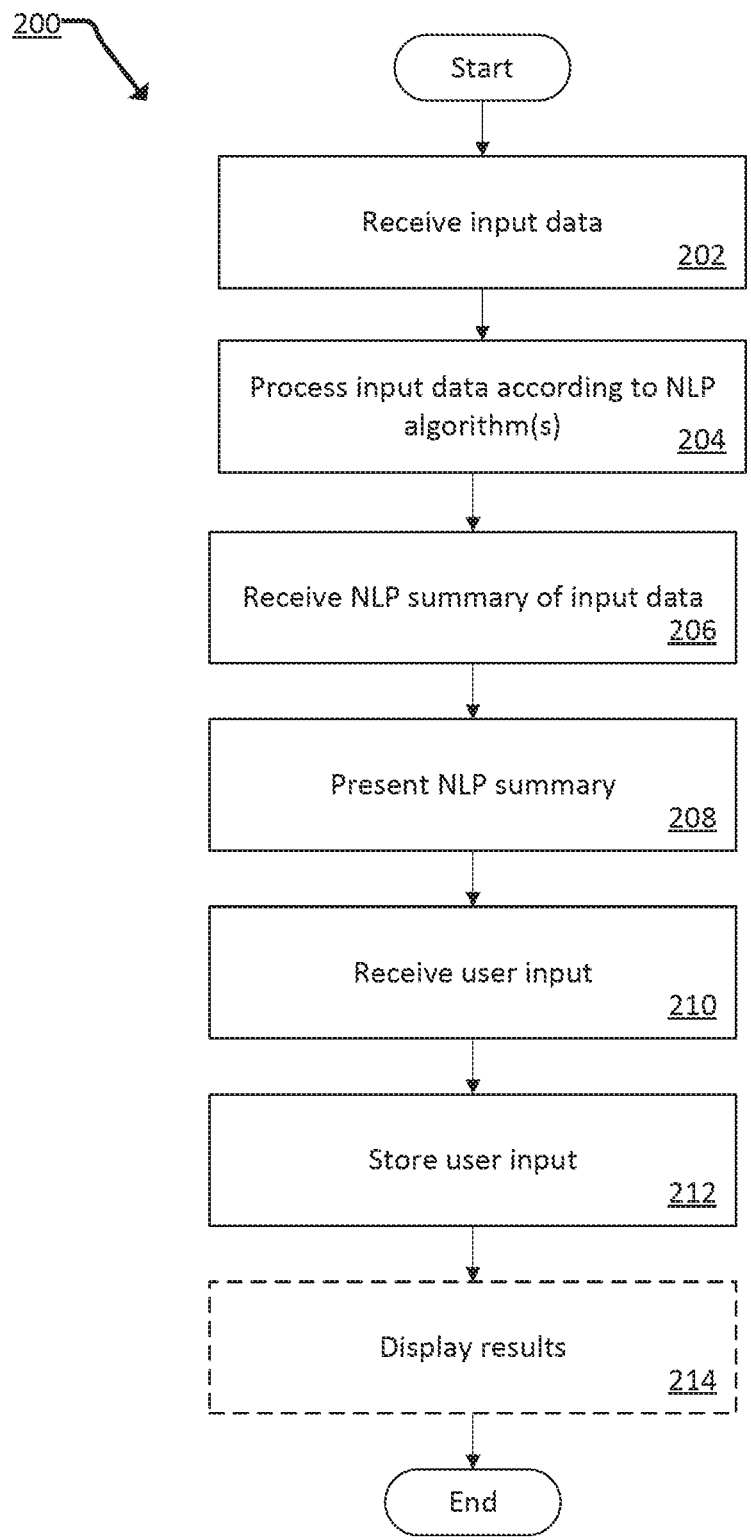
FIG. 2 is a block diagram illustrating a method for intelligently analyzing and presenting legal contracts.

FIG. 2 is a block diagram illustrating a method for intelligently analyzing and presenting legal contracts. FIG. 2 begins with step 202, receive input data. As previously described, input data may refer to user PII data, business data, legal contracts and provisions, and other types of data that may be analyzed using at least one NLP algorithm. In some instances, the input data may be a whole legal contract, or the input data may comprise a portion of a legal contract (a single provision or a group of provisions).

At step 204, the input data is provided to at least one NLP algorithm where the input data is analyzed according to at least one NLP algorithm. The NLP algorithm may identify the most relevant portions of the input data. For example, a particular keyword of the input data that is associated with a pre-coded meta-tag may be identified by the NLP algorithm. Certain provisions containing the phrases "personal data," "identifiable information," and "your data," among others, may be identified as higher priority phrases by the NLP algorithm because those phrases may be directly associated with how a contract is intending to treat a user's PII.

If necessary, the input may be converted to text. For example, if input is received as speech input, a speech-to-text system (e.g., via Cortana® or Siri®) may convert the speech to text. Alternatively, if the input is received as handwritten input (e.g., via touch or stylus), a handwriting-to-text system may convert the stylus or touch input from handwriting to text. After converting the input to text, if necessary, the input may then be further processed by utilizing a natural language processor. In some example aspects, process operation 204 may include comparing historical data regarding the user. For example, the natural language processor of operation 204 may compare current input with historical input for semantic and syntactic patterns to more accurately determine the meaning and intent of the input. In other aspects, process operation 204 may meticulously isolate key words and phrases to identify entities associated with the input. An entity may include any discrete item associated with the input, including third-party applications, specific people or places, events, times, businesses, instructions, and other data that may be stored locally on an electronic device or remotely on a server (e.g., cloud server). The processing step 204 is further described with respect to NLP engine 304 in FIG. 3.

At step 206, an NLP summary may be received. The NLP summary may be a single word, a set of words, a phrase, a visual indicator (e.g., a colored circle or other shape), or other condensed descriptor of the original input data. For instance, a paragraph in a contract discussing how a business is proposing to use a user's PII for research purposes may be summarized by the NLP algorithm as "Research Statement." In another example, a provision of a contract may seek permission to use a user's PII in relation to third-party advertising. The NLP summary for that provision may be, "Consent to use PII for third-party advertising/marketing." In another example, an NLP summary for a provision that governs PII related to financial information may be a green circle, or other visual indicator (e.g., money emoji).

Figure 5:
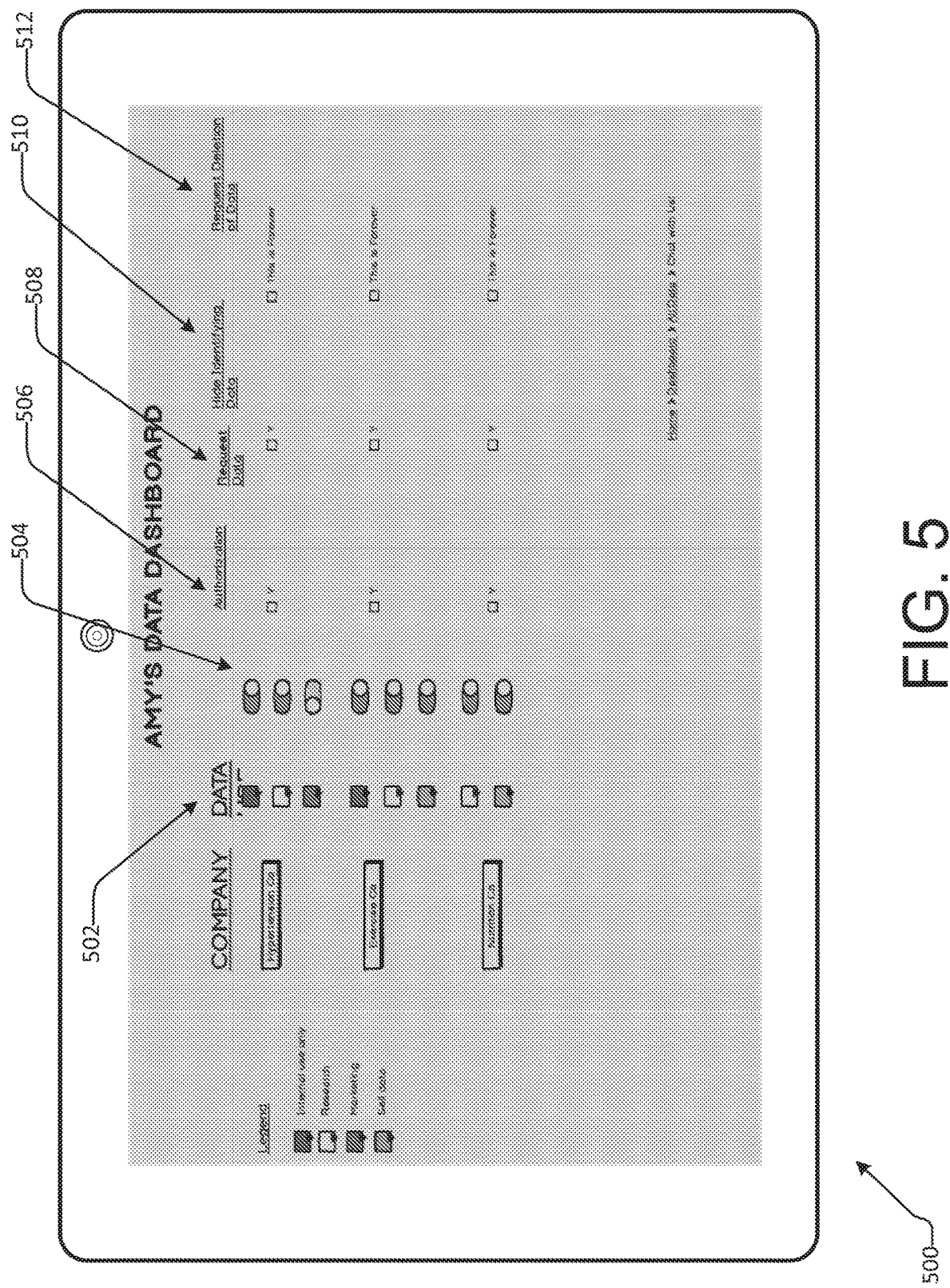
FIG. 5 illustrates an example of an electronic device displaying a user dashboard of an intelligent PII organizer.

At step 208, the NLP summary may be presented. In examples, the NLP summary may be displayed adjacent to the original provision of the contract, allowing a user to easily read the NLP summary but also check the NLP summary against the original language of the contract provision. In further examples, as illustrated in FIG. 5, the NLP summary may be displayed in proximity to at least one switch that may prompt the user to either consent or not consent to a particular provision.

At step 210, user input may be received. User input may comprise an interaction with at least one switch, indicating that the user consents or does not consent to a particular contractual provision. In other examples, the switch may be a checkbox, whereby a user either leaves the box unchecked (indicating no consent) or checked (indicating consent). A multiple choice "yes" or "no" prompt may be displayed to the user, whereby the user input is received as a selection of "yes" or "no." Other methods of indicating consent or withholding consent may be implemented.

At step 212, the user's input of consenting, rejecting, or ignoring may be stored in a database. The user input may be stored locally or remotely. The user input data may be stored for future processing use by at least one machine-learning algorithm.

At step 214, results may be displayed to a user. Step 214 is optional. In some scenarios, a user's decisions to consent or not consent to particular provisions may be aggregated and displayed in a graphical format based on types of provisions or PII (e.g., a bar graph where the Y-axis indicates number of "yes" consent and X-axis indicates groups of provisions or PII types). In other examples, results may indicate aggregated PII that a user has consented may be provided to third-parties. For instance, a user may have consented that various health data may be collected by multiple third-parties. In a display dashboard, such as the dashboard illustrated in FIG. 8, aggregated PII may be displayed. The aggregated PII may be health data, such as blood pressure, weight, height, body temperature, oxygen saturation, BMI, etc. Here, a user may view health-related PII that the user has consented to be shared with a third-party or multiple third parties. In other example aspects, non-health-related PII may be displayed, or a combination of health and non-health related PII may be aggregated and displayed together.

Figure 3:
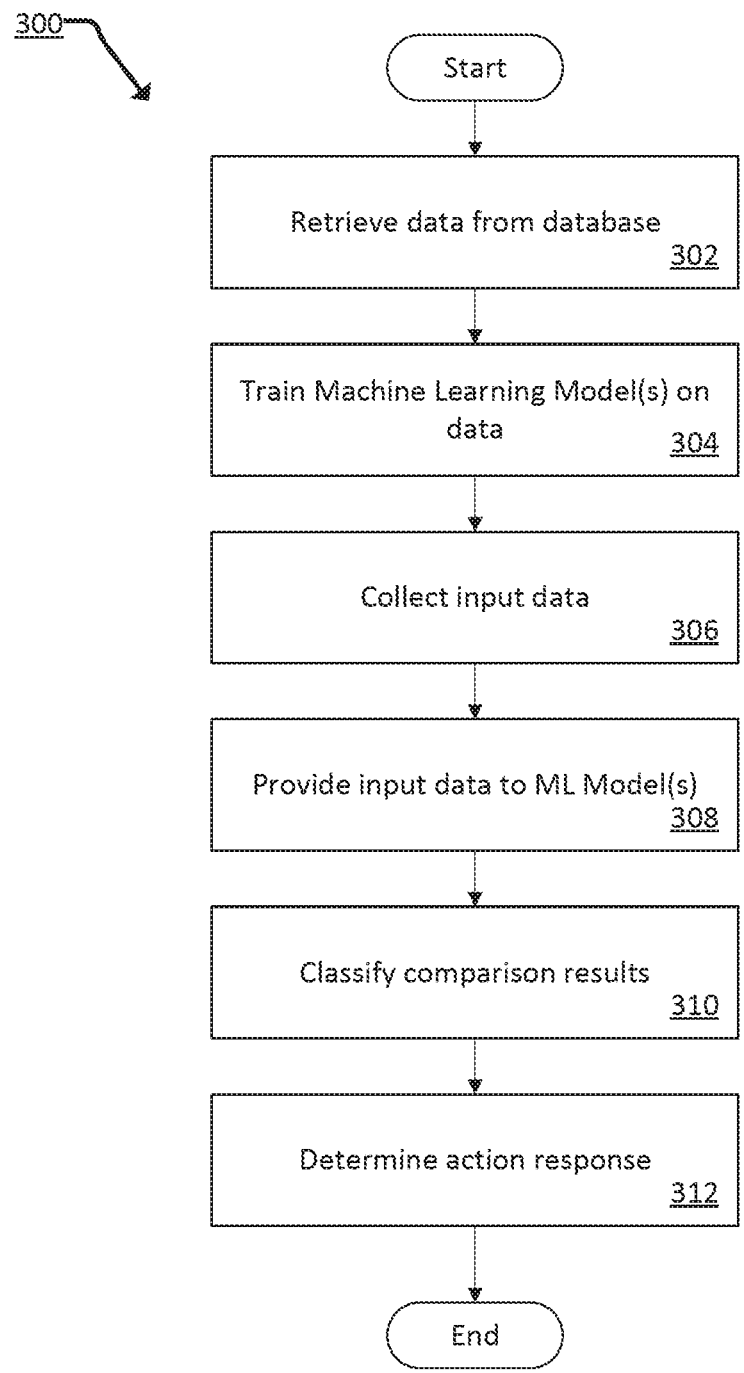
FIG. 3 is a block diagram illustrating a method for implementing at least one machine-learning algorithm to make a recommendation regarding consent.

FIG. 3 is a block diagram illustrating a method for implementing at least one machine-learning algorithm to make a recommendation regarding consent. Method 300 begins with step 302, where data is retrieved from at least one database. The data may refer to a user's past selections to consent or not consent to certain provisions of contractual language. The certain provisions of contractual language that a user may have agreed or not agreed to may be classified according to substance. For instance, certain provisions referring to third-party marketing/advertising may be grouped together.

At step 304, at least one machine learning model may be trained on the input data from the database. The at least one machine learning model may be trained using a variety of machine learning algorithms, including but not limited to linear regression, logistic regression, linear discriminant analysis, classification and regression trees, naïve Bayes, k-Nearest neighbors, learning vector quantization, neural networks, support vector machines (SVM), bagging and random forest, boosting and AdaBoost, k-means, latent class analysis, and/or hierarchical clustering analysis, among other supervised and/or unsupervised machine learning algorithms. Further, various data reduction techniques may be applied to the input data, including but not limited to principal component analysis, among other data reduction algorithms. Targets (or target attributes) may be mapped to the contract provisions. For example, a certain keyword in a contract provision (e.g., a heading or term-of-art) may be associated with a standard contract clause. In other words, the certain term-of-art may be mapped to the "target" contract clause. The machine learning model(s) is trained to find and establish patterns and/or confirm the frequency of recognized patterns that have been established by at least one machine learning model. The machine learning model, once trained, will be able to identify future patterns in input data based on the previously mapped contract features and previously recognized patterns.

At step 306, new input data is collected. Input data may include but is not limited to a user selection of consent, a user selection of rejection, a user non-selection, a contract, a contract provision, a contract term-of-art, parties to the contract, and other information associated with contracts between businesses and users. In at least one aspect, input data may comprise a contract provision and an NLP summary of that contract provision.

At step 308, the input data may be provided to at least one machine learning model. At step 308, the input data may be identified and certain features extracted and grouped together to form patterns. The processing operations may include organizing the collected data into one or more groups and/or sorting the data according to one or more criteria in order to create and identify recognized patterns. The processing operations may additionally include separating certain contract provisions from contracts as a whole. After processing, the trained machine learning model may receive and evaluate the processed input data, which may include features vectors representing recognized patterns appearing in various contract provisions and contract terms-of-art. Comparison results may be generated by the trained machine learning model. As a specific example, the machine learning model may compare the identified and extracted contract terms of the received input data to at least one model trained on previously received contract provisions with similar terms and target attributes that are associated with specific contract term identifiers. The comparison results generated by the trained machine learning model may be used to predict whether the input data (i.e., contract clause) should be agreed to or not by the user. In some aspects, the comparison results may include a confidence indicator (e.g., 70% confidence that the contract clause is similar to other contract clauses the user has seen before) as to whether a user should agree to a certain contract provision or not. For example, the comparison results may include information indicating how confident the model is that one or more contract terms are related to a specific type of contract provision, and based on historical user actions with similar types of contract provisions, the machine-learning model may indicate that the user should not agree to that particular provision. Specifically, if a user has preferences/values that make privacy of personal information a high priority, then certain contract provisions (e.g., allowing a business to use personal data with third-party advertisers) are going to repeatedly be rejected. The pattern that may be established by the user in rejecting certain contract provisions combined with a user's overall privacy profile (indicating a user's preferences as to how his/her PII is shared or distributed among third parties) may be used to train at least one machine-learning model. The model may subsequently be applied to future contract provisions, offering a recommendation of accepting or rejecting to the user.

In other examples, the machine learning models described herein may also be trained on aggregations of population data. For instance, multiple users who may display similar preferences regarding the handling of PII and patterns of accepting and rejecting certain contract provisions may be used to train a machine learning model that may be able to identify a similarly situated user and make intelligent recommendations to that user. Data from aggregated populations may be extrapolated to make suggestions to similarly-situated individuals. For instance, a Democrat voter in her 30's living in Colorado may repeatedly consent to sharing PII related to educational data, demographic/location data, and political data. However, a Republican voter in her 50's may display different data and privacy preferences. The machine learning model may use the data from the Democrat voter in her 30's living in Colorado to make similar consent/no consent recommendations to a user who demonstrates similar political preferences, age, and location. In some example aspects, individual historical data may be coupled with broader population-based data to train the machine-learning model(s) described herein.

In other aspects, the comparison results at step 310 may be converted into a confidence value by aggregating the comparison results (e.g., terms contained in contract provision, parties to agreement, PII identifiers, etc.) and distilling those comparison results into a value (e.g., a percentage). The confidence value may represent an arbitrary numeric value, e.g., on a scale from 1 to 10, with "1" representing a low confidence of agreement and "10" representing a high confidence of agreement. If a certain volume of contract features from the input data is found to be similar to previously processed contract features based on the machine learning model, then a higher confidence score may be generated. For example, if a confidence threshold is set at "10 features," then the identification of six contract terms and two parties may produce a confidence value of 80%. The confidence value may be compared to a confidence threshold. In some aspects, the confidence threshold may be a fixed threshold. In other aspects, the confidence threshold may be dynamically set based on at least one machine-learning algorithm that is trained on previous confidence threshold values and the success rate in identifying provisions that are agreeable to a particular user. If the confidence value equals or exceeds the confidence threshold value, the input data may be classified as an "agreeable" provision. For example, if the confidence threshold is set at "7" and the confidence value is "8," input data may be classified as "agreeable" (e.g., the contract as a whole may be agreeable, or a particular provision in the contract may be agreeable). If the confidence value is less than the confidence threshold value, the input data may be classified as "unagreeable."

At operation 312, an action response is determined based on the classification of the input data. In aspects, when an "agreeable" contract provision is detected at operation 310, an action response may be determined and/or executed that suggests to the user that he/she should accept the provision. However, if the provision is flagged as "unagreeable," then the action response that may be determined and/or executed may suggest to the user that he/she should not accept the particular provision. In other examples, the action response that may be provided to the user may prompt the user to obtain more information. For instance, if a new contract is provided as input data, the machine-learning model may not be trained on particular provisions or data that serves as the focus of the contract. In such instances, the machine-learning model may be able to identify some aspects that are routine but ultimately, the model may not be able to generate a confidence value for either suggesting to agree or not agree to the provision. In such cases, the system may provide a prompt to the user to obtain more information and/or seek outside legal advice.

In some aspects, the methods illustrated in FIGS. 2 and 3 may be combined. For instance, when the NLP summary of a contract provision is presented at step 208, an action response based on the results of the machine-learning model from steps 308 and 310 may also be provided to the user, so that the user may be able to see simultaneously an NLP summary of a particular contract provision (e.g., outlining exactly which types of PII the contract provision is targeting and how the business plans to handle a user's PII) and also a recommendation from the system as to whether the user should consent or not consent to the contract, as a whole, and/or a particular provision from the contract. In further aspects, the system may be configured to automatically consent for a user based on, but not limited to, the user's data privacy preferences, a user's historical actions in consenting or declining to consent to particular contract provisions, and broader population data. In some regards, the system may generate a more accurate and prudent decision-making process of electing when to consent and when not to consent to contracts and/or contract provisions as compared to the majority of individual users today who neglect to read any of a contract's terms or provisions. The systems and methods described herein may enable a user to elect to have the system automatically consent or decline to consent on the user's behalf.

Figure 4:
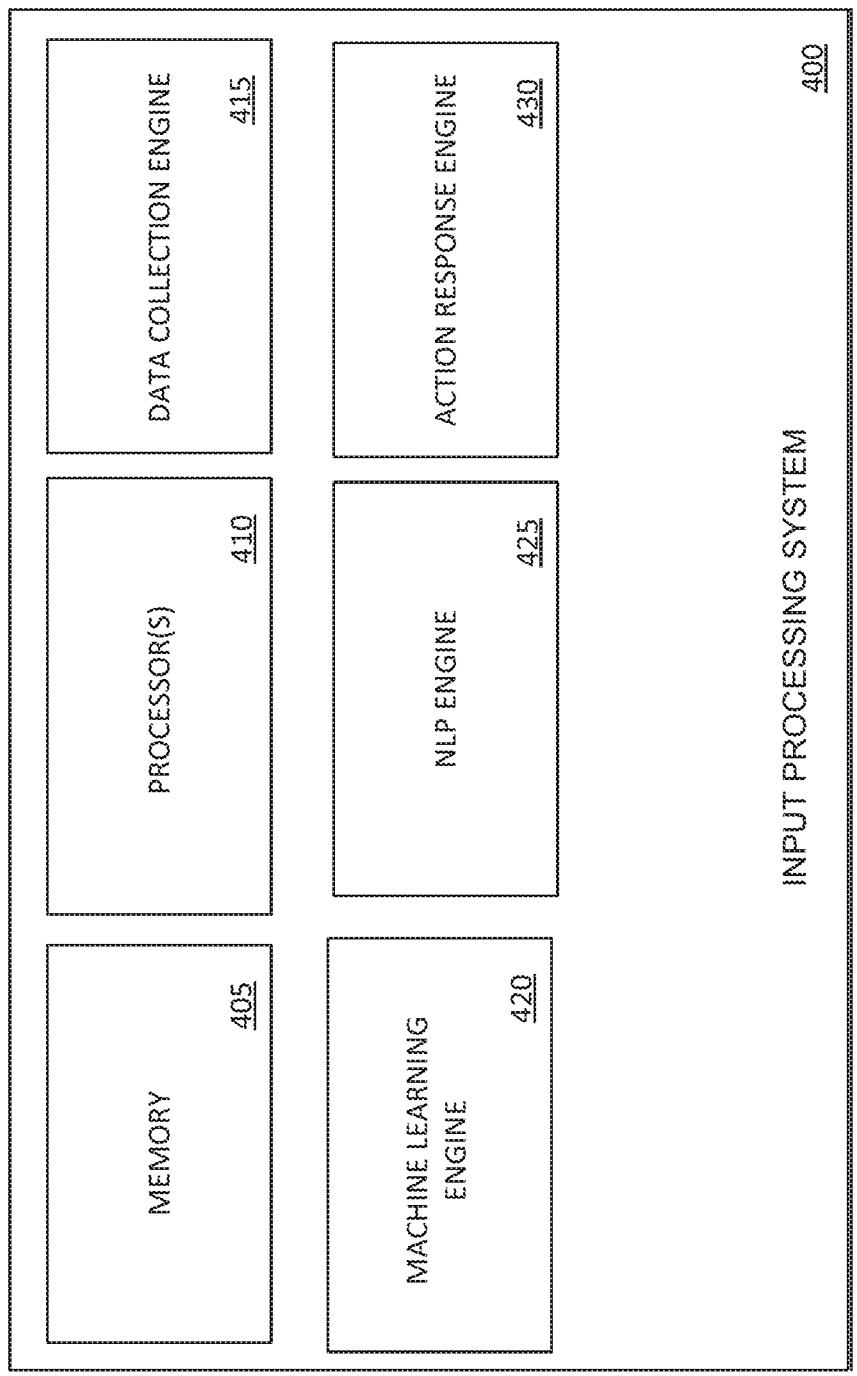
FIG. 4 is a block diagram illustrating an example architecture of an input processor according to some embodiments of the disclosed technology.

FIG. 4 is a block diagram illustrating an example architecture of an input processor according to some embodiments of the disclosed technology. Input processing system 400 may represent, for example, a network operator that provides communication and input processing services to customers/users. In aspects, the disclosed system can include memory 405, one or more processors 410, data collection engine 415, machine learning engine 420, NLP engine 425, and action response engine 430.

Memory 405 can store instructions for running one or more applications or modules on processor(s) 410. For example, memory 405 could be used in one or more embodiments to house all or some of the instructions needed to execute the functionality of data collection engine 415, ML engine 420, NLP Engine 425, and action response engine 430. Generally, memory 405 can include any device, mechanism, or populated data structure used for storing information. In accordance with some embodiments of the present disclosure, memory 405 can encompass, but is not limited to, any type of volatile memory, nonvolatile memory, and dynamic memory. For example, memory 405 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 405.

Data collection engine 415 may be configured to collect user input (e.g., user login information, privacy and security preferences, PII, user selections to legal contracts, etc.) and/or business input (e.g., customer data, contracts, contract provisions, ERP system information, etc.). Other data that may be collected by data collection engine 415 may include social media data (from the user, business, or both), GPS data related to electronic devices (e.g., mobile phone, smart vehicle, computer, etc.), healthcare data, and nutritional data. In aspects, input processing system 400 may detect, or otherwise be informed of, devices (E.g., customer devices, user devices, network appliance devices, etc.) that have connected to input processing system 400 or a network thereof. Input processing system 400 may collect and/or store information related to the detected/connected devices and/or the corresponding users/businesses. Data collection engine 415 may have access to the information collected/stored and may collect or aggregate at least a portion of the collected/stored information. For example, candidate contract terms and provisions may be collected and stored by the data collection engine 415. Alternately, data collection engine 415 may interrogate, or otherwise solicit data from, one or more data sources comprising such information. For example, data collection engine 415 may have access to data in one or more external systems, such as content systems, ERP systems, distribution systems, marketing systems, user profiles or preference setting, authentication/authorization systems, device manifests, or the like. Data collection engine 415 may use a set of APIs or similar interfaces to communicate requests to, and receive response data from, such data sources. In at least one example, the data collection process of data collection engine 415 may be triggered according to a present schedule, in response to a specific user request to collect data, or in response to the satisfaction of one or more criteria (e.g., opening and running an application on a client device). Data collection engine 415 may also employ at least one web crawler, wherein the web crawler is configured to identify legal contracts and collect provisions, terms, features, etc. regarding those legal contracts on the Internet.

In some aspects, the data that may be collected by data collection engine 415 may be encrypted by data collection engine 415 upon receipt. For instance, PII data that a user may input into the system described herein may be encrypted and stored on a secure blockchain (or other cryptographic distributed ledger) in the data collection engine 415.

Machine learning engine 420 may be configured to identify and extract various contract features of a legal document to create recognized patterns. A legal document may include but is not limited to a privacy policy, privacy notice, terms of use, terms and conditions, warranty, disclaimer, waiver of liability, among other legal agreements. In aspects, machine learning engine 420 may have access to data collected by data collection engine 415. Machine learning engine 420 may perform one or more processing operations on the collected data. The processing operations may include organizing the collected data into one or more groups (e.g., a features or objects vector) and/or sorting the data according to one or more criteria (e.g., PII or non-PII according to a specific privacy regulation). The processing operations may additionally include separating PII-related provisions from non-PII-related provisions, so that a user may clearly understand which provisions are purporting to govern the use of PII. For instance, PII-related provisions may be related to how a business desires to collet user data and use that user data, e.g., for research purposes, internal use, third-party advertising, monetization, etc. In at least one example, the identified and extracted contract features may be accessible to data collection engine 415 during the data collection process described above. In yet further examples, the machine learning engine 420 may be configured to aggregate the extracted features into a features vector that defines an established pattern. For example, machine learning engine 420 may extract ten features from a previously agreed-to contract. Five of those features may be related to specific terms-of-art governing PII (E.g., "data," "privacy," "personal information," etc.), and the other five features may be related to specific parties and their historical reputations in protecting user privacy and user PII. Specifically, the system may identify a contract provision that is otherwise agreeable based on historical data, but the system may recommend to the user that the user not agree to the provision because of past privacy violations (e.g., data breach history, FCC violations, etc.) of the business that wishes to contract with the user. The combination of the five PII features and the five party features may comprise a features vector that defines a recognized pattern. The recognized pattern may then be used to train a machine-learning model that will be compared against newer contracts that are input into the system, and the comparison results may determine whether or not a user should agree to a particular provision or not.

Machine learning engine 420 may also be configured to with at least one machine learning model. In some aspects, the contract features that are identified and extracted from a contract (i.e., input data in some examples) may be used to train at least one machine learning model in the machine learning engine 420. For example, to train the machine learning model, the extracted and identified contract features may be associated with specific contract provision identifiers, such as PII, arbitration, warranty, disclaimer, etc. Machine learning engine 420 may utilize various machine learning algorithms to train the machine learning model, including but not limited to linear regression, logistic regression, linear discriminant analysis, classification and regression trees, naïve Bayes, k-Nearest neighbors, learning vector quantization, neural networks, support vector machines (SVM), bagging and random forest, boosting and AdaBoost, k-means, latent class analysis, and/or hierarchical clustering analysis, among other supervised and/or unsupervised machine learning algorithms. The aforementioned machine learning algorithms may also be applied when comparing input data to an already-trained machine learning model. Based on the identified and extracted contract features and patterns, machine learning engine 420 may select the appropriate machine learning algorithm to apply to the contract features to train the at least one machine learning model. For example, if the received contract features are complex and demonstrate non-linear relationships, then machine learning engine 420 may select a bagging and random forest algorithm to train the machine learning model. However, if the contract features demonstrate a linear relationship to certain known contracts and provisions, then machine learning engine 420 may apply a linear or logistic regression algorithm to train the machine learning model.

In other aspects, machine learning engine 420 may apply at least one already-trained machine learning model to the received contract features and patterns to detect previously identified and extracted contract features and previously recognized patterns. Machine learning engine 420 may be configured to compare at least one trained machine learning model to the received contract features to generate comparison results that indicate whether the received contract features are agreeable or unagreeable. Specifically, machine learning engine 420 may compare the identified and extracted contract features of the received contract to at least one model trained on previously received contracts and contract features that are associated with specific contract identifiers. Machine learning engine 420 is also configured to generate comparison results, indicating the similarity (or lack thereof) between certain contract features on which the machine learning model was trained and certain contract features that are identified in the input data. In other aspects, the comparison results may include a data object confidence indicator that a certain data object is present in the input data. For instance, the comparison results may generate a data object confidence indicator that a specific provision is present in the contract. The comparison results may include data object confidence indicator information regarding identified data objects in the received contract features and/or patterns. The data object confidence information may then be used in determining the overall confidence value.

In some examples, the machine-learning models that may implemented may be tested/trained and then a cohort analysis may be applied (e.g., validation cohort, discovery cohort, etc.). Further, the ML models may be constructed using techniques that balance an event rate (e.g., for success vs. failure, yes vs. no, and other binary outcome). When constructing the ML models, variables may first be transformed depending on the nature of the variable. For instance, the transformation may be through creating quartiles or using techniques such as logarithm of variable or thresholds. Significant variables may be chosen based upon models including double machine learning or a matching algorithms, such as propensity score matching. Such algorithms may allow the systems and methods described herein to determine causation for variable effect as it relates to an outcome that is chosen.

For outcomes (e.g., whether a user consents or not to a particular contract provision), consent may be determined by thresholds or by accuracy metrics including recall, precision, F1 scores, AUC (area under curve), classification accuracy, or mean square metrics, among others. Other techniques that may be applied include cox proportional hazard models that may be used for events that vary according to time. Such techniques may be implemented to construct accurate machine learning models and further to determine a confidence score, as described with respect to steps 310 and 312 of FIG. 3. For example, a machine-learning model might be trained using five variables, such as socioeconomic status, age, race, educational history, and zip code/geographic location. The outcome of whether a user might accept or reject a certain contractual provision may be based on these five variables. The techniques described herein may first visualize the distribution of each variable (e.g., of the five variables mentioned) and transform the variables to fit a normalized distribution. Some variables may appear to be strongly collinear, such as socioeconomic status and zip code. In such instances of collinear variables, a correlogram may be created to further understand which variables relate to one another. Further, steps of variable selection (e.g., propensity score matching) or double machine learning techniques may be applied to better understand whether a particular variable adds any prognostic significance to the determination of a user's outcome. In some examples, classes may be highly imbalanced (e.g., some contractual provisions may demonstrate an 80% general consent rate with a 20% rejection rate). To address the shortcomings of imbalanced classes, the systems and methods describe herein may apply techniques to balance the classes (e.g., to achieve a distribution of 50% consent, 50% not consent). Such techniques may include but are not limited to bootstrapping, cross-validation, jackknife, bagging, among other random sampling techniques. Other model validation techniques may be applied, including but not limited to F1 scores, which may represent a measure of precision and recall of the model; mean square error; and/or cox proportional hazards to estimate the effect of a variable on the outcome controlled for time.

In other embodiments, input processing system 400 may be designed in a multi-state configuration and include more than one machine learning engine 420. In such embodiments, a first machine learning engine may be trained to recognize one type of contract (e.g., privacy policy, privacy notice), and a second machine learning engine may be trained to recognize another type of contract (e.g., warranty, waiver of liability). For example, one machine learning engine may be trained on specific types of contract features (e.g., PII identifiers), and another machine learning engine may be trained on other types of contract features (e.g., legal terms-of-art, parties to the contract). In other aspects, multiple machine learning engines may be distributed within the input processing system 400. A multi-state configuration allows for multiple machine learning engines to process data simultaneously, thereby increasing processing power and speed, which may translate to more accurate suggestions regarding whether a user should agree or not agree to a contract/contract provision (i.e., input data).

Input processing system 400 may also be outfitted with an NLP engine 425. NLP engine 425 may receive data from data collection engine 415 and/or data from machine learning engine 420. It should be appreciated that machine learning engine 420 may also receive data from NLP engine 425 for processing and training machine learning models. NLP engine 425 may parse the input data (e.g., a contract) and extract various semantic features and classifiers, among other aspects of the input data. The input data may be converted into semantic representations that may be understood and processed by at least one machine-learning algorithm (housed in machine learning engine 420) to then subsequently determine an appropriate action response.

In some exemplary aspects, the NLP engine 425 may include a tokenization sub-engine, a feature extract sub-engine, a domain classification sub-engine, and a semantic determination sub-engine. The tokenization sub-engine may extract specific tokens from the input data. A "token" may be characterized as any sequence of characters. It may be a single character or punctuation mark, a phrase, a sentence, a paragraph, multiple paragraphs, or a combination of the aforementioned forms. Tokenization sub-engine may isolate key words from the input data and associate those key words with at least one action response (e.g., agree or not agree). For example, the input data may include the phrase "give up all rights and control to your personal data by using this platform" in the context of a terms of use contract. The phrase may be processed by the tokenization sub-engine and associated with a most likely unagreeable provision. Alternately, the phrase may be in the context of a free social media platform. In exchange for a user's free use of the platform, the user is asked to give up his or her data rights. In such instances, the phrase may be associated with an agreeable provision based on the user's privacy and data sharing preferences.

The tokenized input data may then be transmitted to feature extraction sub-engine. Feature extraction sub-engine may extract lexical features and contextual features from the input data. Lexical features may include, but are not limited to, word n-grams. A word n-gram is a contiguous sequence of n words from a given sequence of text. As should be appreciated, analyzing word n-grams may allow for a deeper understanding of the input data and therefore provide more intelligent action responses. At least one machine-learning algorithm within the feature extraction sub-engine may analyze the word n-grams. The at least one machine-learning algorithm may be able to compare thousands of n-grams, lexical features, and contextual features in a matter of seconds to extract the relevant features of the input data. Such rapid comparisons are impossible to employ manually. The contextual features that may be analyzed by the feature extraction sub-engine may include, but are not limited to, a top context and an average context. A top context may be a context that is determined by comparing the topics and key words of the input data with a set of preloaded contextual cues (e.g., a dictionary). An average context may be a context that is determined by comparing the topics and key words of historical processed input data, historical intelligent queries and suggested action responses, manual inputs, public databases, and other data. The feature extraction sub-engine may also skip contextually insignificant input data when analyzing the textual input. For example, a token may be associated with an article, such as "a" or "an." Because articles in the English language are usually insignificant, they may be discarded by the feature extraction sub-engine. However, in other example aspects, the article may be important, as an article may delineate between singular and plural nouns and/or generic and specific nouns.

After processing through the tokenization sub-engine and feature extraction sub-engine, the processed input data may be transmitted to domain classification sub-engine. Domain classification sub-engine may analyze the lexical features and the contextual features that were previously extracted by the feature extraction sub-engine. The lexical and contextual features may be grouped into specific classifiers for further analyses. Domain classification sub-engine may also consider statistical models when determining the proper domain of the action response. To increase the speed of action response delivery, the domain classification sub-engine may analyze the extracted features of the input data, automatically construct an intelligent query based on the extracted features, fire the intelligent query against an external search engine (e.g., comparing certain contract provisions with a broader set of publicly available contracts), and return a consolidated set of appropriate action responses that matched with the intelligent query. In some exemplary aspects, the domain classification sub-engine may be trained using a statistical model or policy (e.g., prior knowledge, historical datasets) with previous input data. For example, the phrase "health data" may be associated with a healthcare privacy domain classification.

The input data may then be transmitted to the semantic determination sub-engine. The semantic determination sub-engine may convert the input data into a domain-specific semantic representation based on the domain(s) That was assigned to the input by the domain classification sub-engine. Semantic determination sub-engine may draw on specific sets of concepts and categories from a semantic ontologies database to further determine which action response(s) to provide to the user based on the input data. For example, a contract may include the phrase "vital signs," which may be associated with other terms and ontologies, such as "blood pressures," "pulse rate," "respiration rate," etc. Further granularity may be available. For instance, "blood pressure" may further be associated with the terms "systolic" and "diastolic."

After the input data is processed through the semantic determination sub-engine, an NLP summary may be generated that distills a certain contract and/or contract provision into a more easily understandable phrase, heading, keyword, etc. For instance, a contract provision may be related to a request to use PII for research purposes. The NLP summary of that provision may be "Research Statement." In another example, a provision of a contract may be related to how a business intends to use user PII internally. Such a provision may receive an NLP Summary of "Internal Use Statement."

In some instances, the NLP engine 425 may take into account a user's level of sophistication in generating the NLP summary. For example, a user's preferences and profile may indicate that a user has a particular level of comprehension and understanding about a particular contract. The NLP engine 425 may consider a user's educational data, geographic data, and historical action responses received by the user in relation to consenting or rejecting certain contracts and contract provisions. To illustrate, a user who may be a highly-educated lawyer may receive an NLP summary that contains legal terms of art that statistically, a highly-educated lawyer will understand. However, a user who is identified as a teenager may be presented with a much simpler NLP summary that, statistically, most teenagers would be able to understand.

Once the input data is fully processed by NLP engine 425, the NLP summary may be provided to machine learning engine 420 for further processing or to action response engine 430.

Action response engine 430 may deliver the results of the processed input data from machine learning engine 420, NLP engine 425, and/or a combination of both. For instance, the NLP summary generated by NLP engine 425 may be provided to action response engine 430 so that the action response engine 430 may display in a side-by-side comparison graphic the NLP summary next to the original language of the contract. In other examples, a switch, checkbox, or other interactive entity may be placed next to the contract provision for the user to select whether the user consents or rejects that particular provision of a contract. In yet further examples, the results of the processed input data from machine learning engine 420 may be provided to action response engine 430, and a recommendation may be provided to the user as to whether a user should accept or reject a certain provision. Such a recommendation may be displayed in proximity to the interactive entity, switch, checkbox etc. where the NLP summary and original contract language may be displayed side-by-side. The recommendation may manifest in the form of a textual overlay, pop-up box, or other visual indicator.

Action response engine 430 may be configured to receive the results from both NLP engine 425 and machine learning engine 420. Action response engine 430 may be configured to deploy an action to a user in the form of a recommendation as to whether or not the user should accept a certain contract provision. In other aspects, the action response engine 430 may be configured to deploy an action to a user in the form of an NLP summary. In yet other aspects, the action response may prompt the user to obtain more information about the input data, e.g., the parties wishing to collect the user's data, the meaning of certain contractual terms, the application for which the contract may govern, etc.

FIG. 5 illustrates an example of an electronic device displaying a user dashboard of an intelligent PII organizer, as described herein. Device 500 illustrates an example data dashboard from a user-facing side of the system. After the user signs into the system and inputs information to the system, a user may then begin entering into contracts with third parties. The systems and methods described herein may collect a user profile and privacy preferences as the user accepts or rejects particular contracts. As seen from the dashboard, data column 502 provides the user an opportunity to see exactly which data the user is sharing with the associated company. Column 504 provides the user a control mechanism for immediately revoking or granting access to that data to the company. For instance, if a health company is continuously receiving health-related PII from the user, the user may elect to quickly revoke consent by toggling the appropriate switch in column 504. Future healthcare-related PII will no longer be transmitted to the healthcare company that no longer has the user's consent to receive the user's healthcare PII. Furthermore, column 506 provides the user with an option to consent to all PII data collection of an entity. By selecting the "authorization" checkbox, the user may authorize a company to access all requested data. Column 508 provides the user a mechanism to request what user data the company may have stored relating to the user. Column 510 provides a mechanism for a user to hide identifying data. For instance, by selecting to hide identifying data, a user may be still share some information with a company, but may encrypt certain PII. Column 512 may allow a user to request deletion of all data from a third party. By selecting this option, a transmission request may be received from the intelligent contract analysis and data organization system dashboard displayed in device 500 and transmitted to the associated third-party. Such a request may be consistent with the CCPA's and GDPR's right to be forgotten and right to erasure, among other privacy policy provisions.

Figure 6:
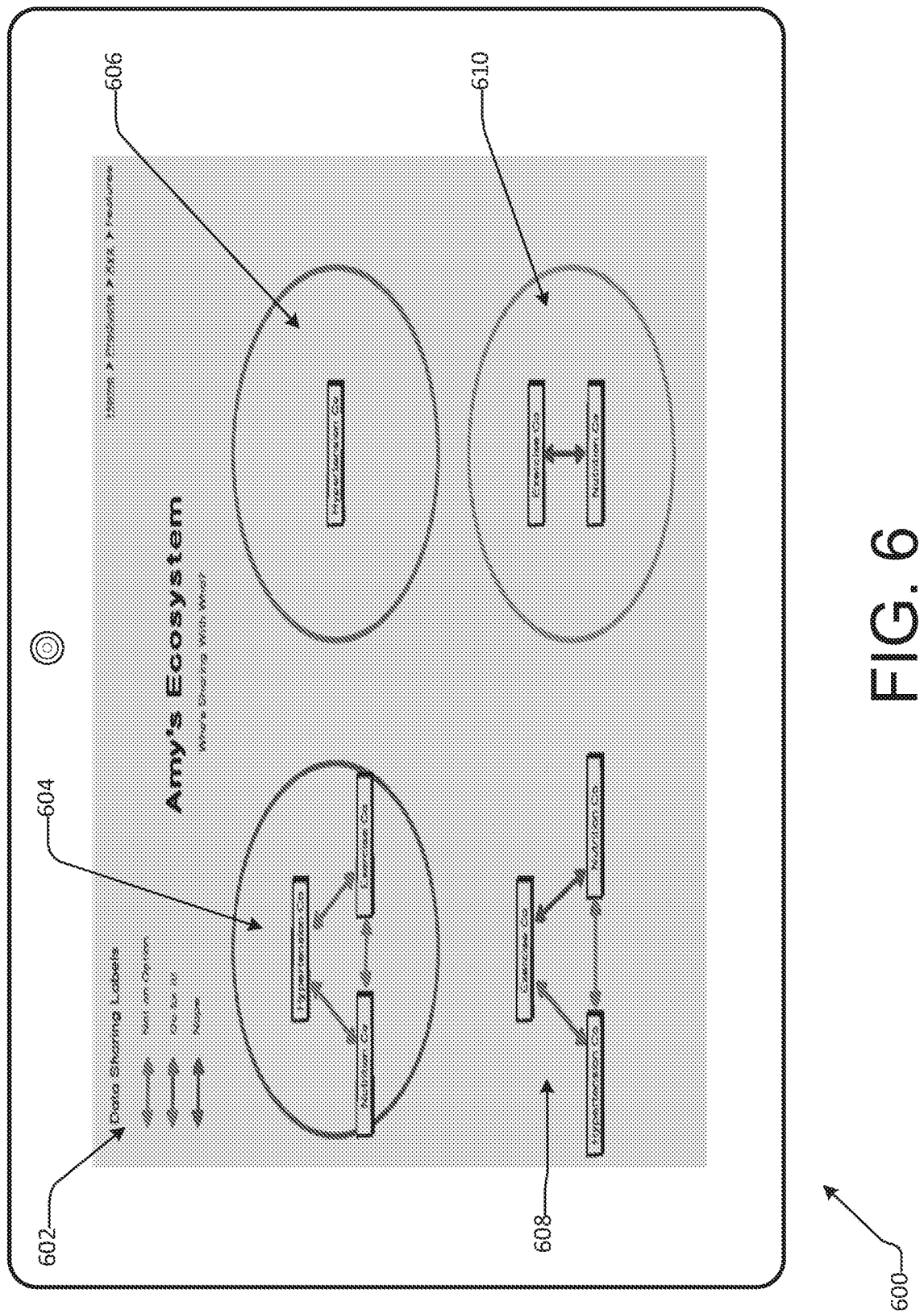
FIG. 6 illustrates an example of an electronic device displaying a visual summary of where a user's data may be currently shared and stored with respect to third parties.

FIG. 6 illustrates an example of an electronic device 600 displaying a visual summary of where a user's data may be currently shared and stored with respect to third parties. The ecosystem dashboard displayed on device 600 may include a set of labels 602 that indicate to the user how data is being transferred or shared among third parties. For instance, if a user consents to sharing data with a third party and further consents for that third party to share the user's data with other third parties, that connection may be displayed in the dashboard appearing in FIG. 6. The labels 602 may indicate whether the data is currently being shared, not being shared, or inapplicable, among other labeling options. Different configurations of the ecosystem dashboard may be presented to the user. For example, configuration 608 may display how a user's SSN is shared among three different companies, while configuration 604 may display how a user's healthcare PII is shared among three other companies. Configuration 606 may display a single company for which certain PII may be shared with that company. In another instance, configuration 610 may display a corporate structure where a user consents to sharing data with one company that is a subsidiary of another company, and the contract provisions allow for the PII received by the subsidiary company to be shared with the parent company.

Figure 7:
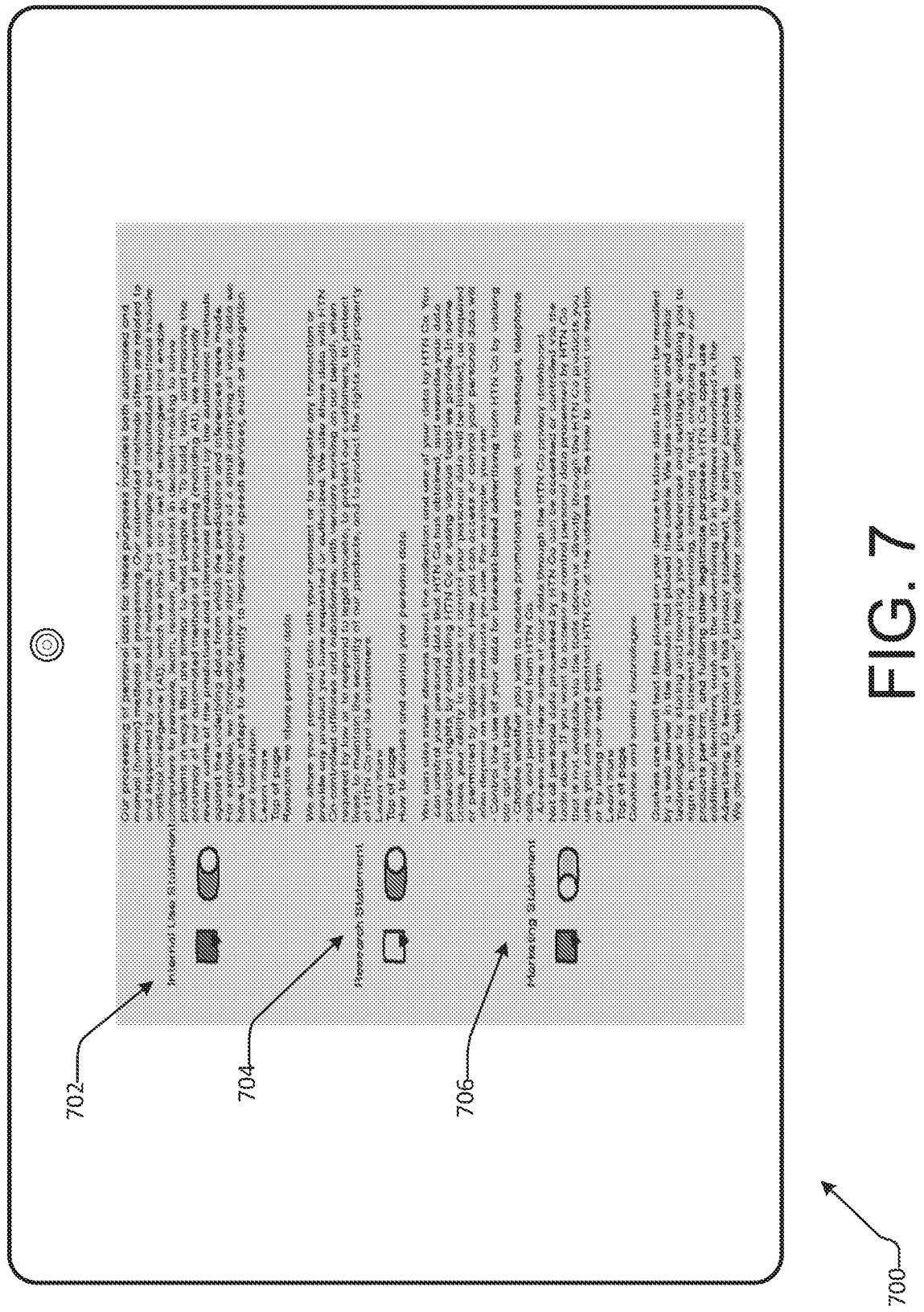
FIG. 7 illustrates an example of an electronic device displaying original language of a legal contract next to an NLP-generated summary.

FIG. 7 illustrates an example of an electronic device displaying original language of a legal contract next to an NLP-generated summary. As illustrated, the NLP summaries 702, 704, and 706 are displayed adjacent to the original contract provisions appearing on the right side of the screen. For instance, the NLP summary 702 reads "Internal Use Statement." NLP summary 704 reads "Research Statement." NLP summary 706 reads "Marketing Statement." A user may be able to access exactly which personal data the relevant contract provision is purporting to govern from this screen by selecting a button in proximity to the NLP summary. Further, a user may dynamically give and revoke consent to particular provisions from this screen. For instance, the toggle switch that appears below the NLP summaries 702, 704, and 706 may be used to dynamically give and revoke consent to particular contract provisions. In other example aspects, the mechanisms by which a user may dynamically give and revoke consent may include any variations of buttons, switches, etc.

As described previously, the machine-learning engine 420 may generate a recommendation to a user as to whether a user should accept or reject a particular provision. The recommendation, which may be provided via action response engine 430, may be displayed, for example, is display 700 as a pop-up box overlaying a particular provision, or the recommendation may appear as a text overlay or other visual indicator in proximity to the relevant contract provision. In some example aspects, the toggle switches may be placed in positions that are consistent with the ML recommendations, and a user may be prompted to confirm or reject the recommendations from the system.

Figure 8:
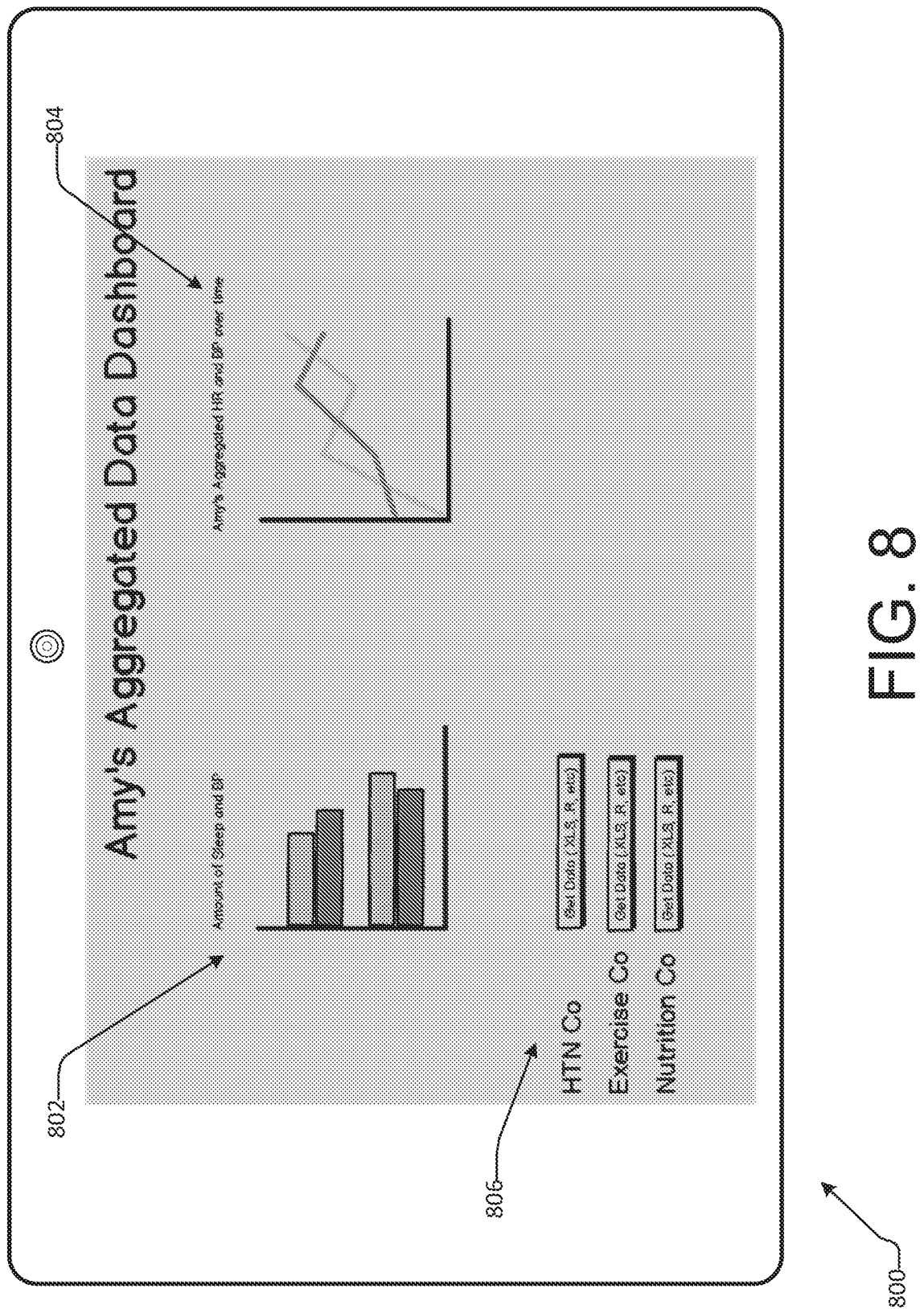
FIG. 8 illustrates an example of an electronic device displaying aggregated PII.

FIG. 8 illustrates an example of an electronic device displaying aggregated PII. In some example aspects, aggregated user data may be displayed in a dashboard, as displayed in device 800. The dashboard may aggregate all PII that is currently being shared with third-parties and display it for the user to see in one place. For instance, health PII may be displayed in the dashboard, showing amount of sleep and blood pressure in graph 802, aggregated heart rate and blood pressure in graph 804, and a user interface tool 806 for retrieving other data that is provided to different companies, e.g., HTN Co, Exercise Co, and Nutrition Co. The data may be retrieved from third-party storage databases and/or databases used by the systems and methods described herein, such as local databases from a client device or remote databases that may be accessed over a network or networks.

Figure 9:
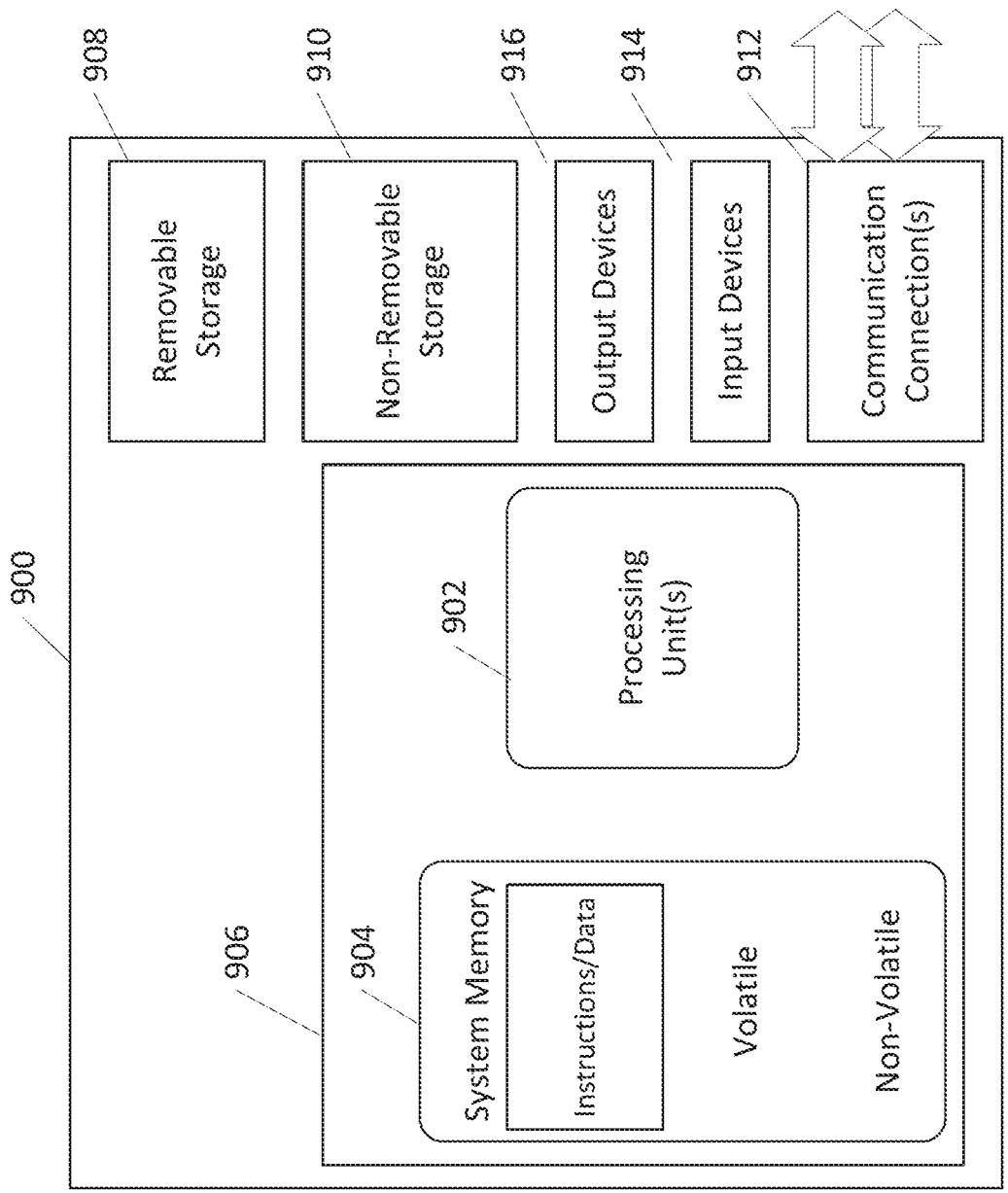
FIG. 9 illustrates one example of a suitable operating environment in which one or more of the present embodiments of the intelligent contract analysis and data organization system disclosed herein may be implemented.

FIG. 9 illustrates one example of a suitable operating environment 900 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 9 by dashed line 906. Further, environment 900 may also include storage devices (removable, 908, and/or non-removable, 910) including, but not limited to, magnetic or optical disks or tape. Similarly, environment 900 may also have input device(s) 914 such as keyboard, mouse, pen, voice input, etc. and/or output device(s) 916 such as a display, speakers, printer, etc. Also included in the environment may be one or more communication connections, 912, such as LAN, WAN, point to point, etc.

Operating environment 900 typically includes at least some form of computer readable media. Computer readable media can be any available media that can be accessed by processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:
   receiving data associated with at least one legal document, wherein the data comprises at least one word in the at least one legal document;
   extracting a set of features from the data associated with the at least one legal document, wherein the set of features comprises at least one ontological feature of the at least one word;
   evaluating the set of features using at least one natural language processing (NLP) algorithm and at least one machine-learning model, wherein the at least one machine-learning model is trained on a historical database of user inputs;
   based on the evaluation of the set of features using the at least one NLP algorithm and the at least one machine-learning model:
   generating an NLP summary associated with the at least one legal document; and
   generating at least one suggested action response associated with the at least one legal document;
      displaying the NLP summary and the at least one suggested action response;
      receiving at least one user input associated with the suggested action response; and
      storing the user input in the historical database.

2. The system of claim 1, wherein the at least one user input associated with the suggested action response comprises at least one of an accept action and a rejection action, wherein the accept action indicates an acceptance of at least one term in the at least one legal document and wherein the rejection action indicates a rejection of at least one term in the at least one legal document.

3. The system of claim 1, wherein generating at least one suggested action response further comprises:
   generating a confidence value based on the evaluation of the set of features from the data associated with the at least one legal document, wherein the confidence value indicates a likelihood the user input will be an accept action;
   comparing the confidence value to a confidence threshold; and
   when the confidence value exceeds the confidence threshold, classifying at least one provision associated with the at least one legal document as agreeable.

4. The system of claim 1, wherein at least one user profile is created based on the historical database of user inputs and the at least one machine-learning model.

5. The system of claim 4, wherein the at least one user profile is comprised of at least a first set of contract provisions classified as agreeable and at least a second set of contract provisions classified as unagreeable.

6. The system of claim 1, wherein generating an NLP summary associated with the at least one legal document further comprises:
   identifying at least one law or at least one regulation that is associated with the at least one legal document.

7. The system of claim 1, wherein generating an NLP summary associated with the at least one legal document further comprises:
   applying at least one meta-tag to the at least one word, wherein the at least one meta-tag indicates at least one ontology of the at least one word.

8. The system of claim 1, wherein the data associated with the at least one legal document further comprises at least one of: a character, a phrase, and a paragraph.

9. The system of claim 1, wherein displaying the NLP summary and the at least one suggested action response further comprises:
   displaying at least one graphical representation of the NLP summary.

10. The system of claim 1, wherein displaying the NLP summary and the at least one suggested action response further comprises:
    emphasizing at least one provision of the at least one legal document, wherein the at least one provision is associated with personally identifiable information (PII).

11. The system of claim 2, wherein the user input is the accept action, further comprising:
    receiving at least one set of PII;
    encrypting the at least one set of PII; and
    transmitting the at least one set of PII to a third-party.

12. The system of claim 11, wherein the third-party is at least one of: a healthcare provider, a hospital, and a healthcare physician.

13. The system of claim 11, further comprising:
    receiving a user request associated with the deletion of the at least one set of PII.

14. A computer-implemented method for analyzing a legal contract based on a user profile, comprising:
    receiving data associated with at least one legal document, wherein the data comprises at least one clause in the at least one legal document;
    extracting a set of ontological features from the at least one clause;
    evaluating the set of ontological features using at least one natural language processing (NLP) algorithm and at least one machine-learning model, wherein the at least one machine-learning model is trained in part on a historical database of user inputs and the user profile;
    based on the evaluation of the set of ontological features using the at least one NLP algorithm and the at least one machine-learning model:
    generating a confidence value based on the evaluation of the set of ontological features, wherein the confidence value indicates a degree of agreeability;
    generating an NLP summary associated with the at least one legal document; and
    generating at least one suggested action response based on the confidence value;
    displaying the NLP summary and the at least one suggested action response;
    receiving at least one user input associated with the suggested action response; and
    storing the user input in the historical database.

15. The method of claim 14, wherein evaluating the set of ontological features using the at least one NLP algorithm and at least one machine-learning model comprises using at least one of: a linear regression, a logistic regression, a linear discriminant analysis, a regression tree, a naïve Bayes algorithm, a k-nearest neighbors algorithm, a k-means algorithm, a learning vector quantization, a neural network, a support vector machines (SVM), a random forest algorithm, an AdaBoost algorithm, a latent class analysis, and a hierarchical clustering analysis.

16. The method of claim 14, further comprising:
comparing the confidence value to a confidence threshold; and
when the confidence value exceeds the confidence threshold, classifying the least one clause as agreeable.

17. The method of claim 16, wherein the confidence threshold is based on at least one accuracy metric.

18. The method of claim 17, wherein the at least one accuracy metric is at least one of: recall, precision, F1 score, area under curve, classification accuracy, and mean square metric.

19. The method of claim 14, wherein the at least one machine-learning model is further trained on at least one set of socioeconomic data associated with at least one demographic.

20. A non-transitory computer-readable media storing computer executable instructions that when executed cause a computing system to perform a method comprising:
receiving historical data from a historical database associated with user input related to a first legal document, wherein the user input comprises at least one accept action and at least one rejection action;
creating at least one user profile based on the historical data;
training at least one machine learning model based on the at least one user profile;
receiving data associated with a second legal document, wherein the second legal document is similar to the first legal document;
extracting at least one provision from the second legal document;
evaluating the at least one provision using at least one natural language processing (NLP) algorithm and the at least one machine-learning model;
generating a confidence value based on the evaluation of the at least one provision, wherein the confidence value indicates a degree of agreeability;
generating an NLP summary associated with the at least one legal document;
generating at least one suggested action response based on the confidence value and based on a confidence threshold;
displaying the NLP summary and the at least one suggested action response;
receiving at least one user input associated with the suggested action response; and
storing the user input in the historical database.

* * * * *